(12) United States Patent
Choo et al.

(10) Patent No.: US 6,580,489 B2
(45) Date of Patent: Jun. 17, 2003

(54) LIQUID CRYSTAL DISPLAY PANEL AND A SUBSTRATE CAPABLE OF BEING CUT BY A LASER LIGHT

(75) Inventors: Dae-ho Choo, Suwon (KR); Byeong-ill Kim, Seoul (KR); Sung-uk Jung, Seoul (KR); Woo-shik Lee, Seoul (KR); Bum-soo Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/920,799

(22) Filed: Aug. 3, 2001

(65) Prior Publication Data

US 2002/0027629 A1 Mar. 7, 2002

Related U.S. Application Data

(62) Division of application No. 09/231,109, filed on Jan. 14, 1999, now Pat. No. 6,297,869.

(30) Foreign Application Priority Data

Dec. 4, 1998 (KR) .............................. 98-53540
Dec. 4, 1998 (KR) .............................. 98-53543
Dec. 4, 1998 (KR) .............................. 98-53548

(51) Int. Cl.[7] .................. G02F 1/13; G02F 1/1341; G02F 1/1339

(52) U.S. Cl. .................. 349/187; 349/189; 349/190

(58) Field of Search ............................ 349/187, 189, 349/190; 219/121.6, 121.64

(56) References Cited

U.S. PATENT DOCUMENTS

| 5,138,131 | A | * | 8/1992 | Nishikawa et al. | 219/121.67 |
|---|---|---|---|---|---|
| 5,622,540 | A | * | 4/1997 | Stevens | 219/121.6 |
| 5,760,855 | A | * | 6/1998 | Nakase et al. | 349/149 |
| 5,805,246 | A | * | 9/1998 | Lee et al. | 349/150 |
| 5,851,411 | A | * | 12/1998 | An et al. | 216/23 |
| 6,086,443 | A | * | 7/2000 | Shin et al. | 349/189 |
| 6,122,033 | A | * | 9/2000 | Mathew et al. | 277/628 |
| 6,130,401 | A | * | 10/2000 | Yoo et al. | 219/121.6 |

FOREIGN PATENT DOCUMENTS

JP   10-256042   * 9/1998

* cited by examiner

Primary Examiner—Tarifur R. Chowdhury
(74) Attorney, Agent, or Firm—Hae-Chan Park; McGuireWoods LLP

(57) ABSTRACT

Disclosed is a liquid crystal display panel capable of being cut by a laser light. The liquid crystal display panel according to the present invention includes a substrate having a buffer layer between a conducting layer and an inner surface of the substrate, in which the buffer layer is disposed along a cutting line and spreads a crack and edges of the conducting layer is positioned in a region defined by the cutting line. Further, a method for manufacturing the liquid crystal display panel is disclosed, in which the liquid crystal display panel is machined by a laser cutter and a laser grinder.

5 Claims, 11 Drawing Sheets

LIQUID CRYSTAL DISPLAY PANEL AND A SUBSTRATE CAPABLE OF BEING CUT BY A LASER LIGHT

This application is a divisional of application Ser. No. 09/231,109, filed Jan. 14, 1999, now U.S. Pat. No. 6,297,869B1.

BACKGROUND OF THE INVENTION

1. Field of the Invention

The present invention relates to a liquid crystal display panel, and more particularly to a structure of an upper and lower substrates of the liquid crystal display panel which is cut into an unit panel before a liquid crystal is introduced between the upper and lower substrates integrated with each other. Further, the present invention relates to a manufacturing the liquid crystal display panel which is capable of being cut by a laser light.

2. Description of the Prior Art

Recently, a liquid crystal display (hereinafter, referred to as a LCD) module is widely used as a display unit instead of a cathode ray tube, because of its small size, light weight, and low consumption of power. The LCD module is a plan display unit using a liquid crystal as a light shutter transmitting and screening a transmission of the light, according to the electric signal.

A thin film transistor LCD module (hereinafter, referred to as TFT LCD module) is provided with a TFT substrate, a color filter substrate, and a liquid crystal introduced between the TFT substrate and the color filter substrate. The TFT substrate and the color filter substrate are made of two parent glass substrates which are respectively divided into six LCD panels.

The parent glass substrate which is used for the TFT substrate has a plurality of gate lines, a plurality of data lines which are respectively intersected with each gate line, TFT devices respectively formed at each intersection of the gate lines and the data lines, and pixel electrodes.

Another parent glass substrate which is used for the color filter substrate includes color filter layers respectively having red, green, and blue, a black matrix, and corresponding electrodes. The black matrix prevents a mixture of light in the color filter layers and keeps the thin film transistors from operating in an off-state.

The TFT substrate and the color filter substrate as constructed above are arranged, assembled together and cut along a cutting line into a plurality of the LCD panels before the liquid crystal is introduced between the substrates.

FIGS. 1 and 2 are views showing processes of cutting the integrated substrate by using a diamond scriber and attaching a polarizing plate to the substrate.

Referring to FIG. 1, a method of manufacturing an LCD panel according to the conventional art includes a step ST1 of integrating substrates, a step ST2 of cutting the integrated parent substrates using the diamond scriber, a step ST3 of filling the liquid crystal between the integrated substrates, a step ST4 of sealing a liquid crystal introducing inlet of the integrated substrates, a step ST5 of attaching the polarizing plates to outer surfaces of the integrated substrates, a step ST6 of grinding a cut surface of the substrates using a grinder, and a step ST7 of transferring the substrates to an assembling stage.

Referring to FIG. 2, a method of manufacturing an LCD panel according to another conventional art includes a step of cutting the integrated parent substrates using a diamond scriber, a step of filling the liquid crystal between the integrated substrates, a step of sealing a liquid crystal introducing inlet of the integrated substrates, a step of grinding a cut surface of the substrates using a grinder, a step of attaching the polarizing plates to outer surfaces of the integrated substrates, and a step ST7 of transferring the substrates to an assembling stage.

Regarding methods of manufacturing the LCD panel according to the conventional art, at the grinding step, one of the integrated substrates is cut along cutting lines C1, C2 and G1, and then has been grinded at a predetermined angle at the corner of cut surfaces thereof, as shown in FIGS. 3 and 4. In FIGS. 3 and 4, a reference numeral 14 denotes a short bar connecting gate lines 12 with each other and a reference numeral 16 indicates a short bar connecting data lines with each other. The short bars 14 and 16 discharge the static electricity generated while cutting the substrates.

The grinding step removes glass chips remaining at edges of the substrates from the substrates, prevents damage to a printed circuit board attached to a pad and protects the gate line, the data lines and the panel from cracking.

According to the method referred in FIG. 1, the glass chips around the edges of the substrates generated during the cutting step cause defects in attaching the polarizing plates to the substrates. The defect in the attachment of the polarizing plates forces the polarizing plates to be re-attached, which increases a manufacturing cost.

The method in which the substrate is ground before attaching the polarizing plates as referred in FIG. 2 may remarkably reduce defects in the polarizing plate attachment. However, the removal of the short bar 14 from the substrates cut along the cutting line G1 as shown in FIGS. 3 and 4, causes malfunction of the panel's TFTs due to the static charges due to a friction during the grinding step.

Referring to FIG. 3 again, the cutting of the parent substrate using the laser light starts at an outer surface of the substrate. The parent glass substrate can be cut along the cutting lines, but the interconnection lines 12 formed on an inner surface of the substrate are occasionally not cut. As shown in FIGS. 5a and 5b, even though the parent glass substrate 10 is exactly cut along the cutting lines C1 and C2, the crack generated in the parent glass substrate 10 may not be transferred to the interconnection lines 12 disposed on the inner surface of the substrate and the interconnection lines 12 are not exactly cut.

It is considered that the cutting problems are caused by the ductility and heat expansion difference of metals used for the interconnection lines.

Sealant is coated on the inner surface of one substrate in order to integrate the substrates together.

FIG. 6 is a view showing the sealant coated on the substrate, the liquid crystal introducing inlet 37, and the cutting line 39a on the substrate according to the present invention. Reference numerals 38a, 38b, 39a, and 39b respectively denote the cutting line and reference numeral 34 indicates the black matrix.

Referring to FIG. 6, a seal line formed on the substrate, except for the liquid crystal introducing inlet is not overlapped with the cutting line. However, a part of the seal line forming the liquid crystal introducing inlet extends across the cutting line 39a. Therefore, since the cutting line 39a near the liquid crystal introducing inlet 37 is cut under a cutting condition different from another cutting lines, it is difficult to cut the integrated substrate into a plurality of panels by laser. Thus, different cutting conditions for the portion near the liquid crystal introducing inlet and for the rest of the substrate have to be set up, which complicates the cutting process.

As shown in FIG. 12, in the case that the cutting line 39a extends across a neck portion of the liquid crystal introducing inlet 37, there is a problem in that when the sealant 56 is supplied to close the liquid crystal introducing inlet 37, air is introduced through the liquid crystal introducing inlet 37 into a liquid crystal layer between the integrated substrate 32.

SUMMARY OF THE INVENTION

The present invention has been made to overcome the above described problems of the prior art.

It is an object of the present invention to provide a substrate for a liquid crystal display panel, in which glass chips are prevented from being created during a cutting of the substrate.

It is another object of the present invention to provide a liquid crystal display panel of which substrates are grinded without generating static charges.

It is still an objet of the present invention to provide a method of manufacturing a liquid crystal display panel capable of being cut by a laser light, in which a conducting layer formed in an inner surface of a substrate can be prevented from being cut during the cutting o f the substrate.

It is still further an object of the present invention to provide a method of manufacturing a liquid crystal display panel capable of being cut by a laser light, in which air can be prevented from being introduced through a liquid crystal inlet between the substrates of the panel at a step of sealing the liquid crystal inlet.

To accomplish the above object of the present invention, according to an aspect of the present invention, there is provided a method of manufacturing a liquid crystal display panel capable of being cut by laser, comprising the steps of:

emitting a laser light to cut a substrate along a cutting line indicated on the substrate; and attaching a polarizing plate to an outer surface of the substrate.

The method of manufacturing a liquid crystal display panel capable of being cut by laser further comprising a step of grinding edges of a cut surface of the substrate after the step of attaching the polarizing plate to the outer surface of the substrate.

The step of grinding the edges of the cut surface of the substrate may be performed after the step of attaching the polarizing plate to the outer surface of the substrate.

The laser light focused on the substrate has an ellipse shape, of which an apsis line is parallel to the cutting line and a minor line is normal to the cutting line. Therefore, the grinding using the laser light can be omitted.

A parent substrate for the liquid crystal display panel according to the present invention includes a short bar thereon connecting the wire with the others and has the first and second cutting lines which is spaced at a predetermined distance from and parallel to both side of the short bar.

According to another aspect of the present invention, there is provided a method of manufacturing a liquid crystal display panel capable of being cut by laser, comprising the steps of:

cutting a panel along a cutting line using laser, the panel being formed in such a manner that a first transparent insulated substrate having a thin film transistor and wires and pixel electrodes connected with the thin film transistor on an inner surface thereof is integrated to face a second transparent insulated substrate having a color filter layer and electrodes on an inner surface thereof;

introducing liquid crystal in a space between the first and second transparent substrates and sealing an inlet for introducing the liquid crystal;

grinding edges of the first and second cut substrates using laser; and attaching polarizing plates to each of outer surfaces of the first and second substrates.

According to still another aspect of the present invention, there is provided a liquid crystal display panel capable of being cut by laser, comprising:

a first transparent insulated substrate having a thin film transistor and wires and pixel electrodes connected with the thin film transistor on an inner surface thereof, ends of the wires are positioned at a predetermined position near a cutting line on the first transparent insulated substrate;

a second transparent insulated substrate having a color filtering layer and electrodes corresponding to the pixel electrodes on an inner surface thereof; and sealant which is disposed along edges of one of the first and second substrates to form an inlet for introducing the liquid crystal in a place in order that the first transparent insulated substrate is integrated with the second transparent insulated substrate, wherein the panel is cut along the cutting line.

According to still further aspect of the present intention, there is provided a substrate capable of being cut by laser comprising:

a substrate having an inner surface and an outer surface with a cutting line;

a conducting layer which is deposited on the inner surface along a cutting line of the inner surface corresponding to the cutting line on the outer surface of the substrate; and a buffer layer which is disposed along the cutting line between the inner surface and the conducting layer of the substrate, wherein the substrate and the buffer layer are separately cut by laser having different wavelength and the buffer layer is cracked by the conducting layer.

According to still further aspect of the present invention, there is provided a liquid crystal display panel capable of being cut by laser comprising:

a first transparent insulating substrate including thin film transistors formed on an inner surface and a wire connected with the thin film transistors and pixel electrodes;

a second transparent insulating substrate having an inner surface corresponding to the first transparent insulating substrate, a color filter layer formed on the inner surface, a black matrix and corresponding electrodes; and a buffer layer which is disposed between the conducting layer and the inner surface and diffuses a crack generated therein to the conducting layer vertically, wherein one of the first and second substrate has a cutting line on an outer surface thereof and the first and second substrates and the buffer layer are respectively cut by laser having a different wavelength.

The first and second transparent insulating substrates is made of a parent glass substrate which has an area corresponding to a sum of areas of the first and second substrates.

The buffer layer is formed on the inner surface of one of the first and second substrates along a cutting line corresponding to the cutting line formed on the outer surface of one of the first and second substrates, with a predetermined width.

The buffer layer is formed on the inner surfaces of the first and second transparent insulating substrates along cutting lines corresponding to the cutting line on the outer surface, with a predetermined width.

BRIEF DESCRIPTION OF THE DRAWINGS

The above objects and other advantages of the present invention will become more apparent by describing in detail the preferred embodiment thereof with reference to the attached drawings, in which:

FIGS. 5a and 5b are partially sectional views of the thin film transistor substrate, in which FIG. 5a is a sectional view of the thin film transistor substrate, taken along a line C1 and FIG. 5b is a sectional view of the thin film transistor substrate, taken along a line C2 in FIG. 3;

DESCRIPTION OF THE PREFERRED EMBODIMENT

Hereinafter, a method of manufacturing a liquid crystal display panel capable of being cut by a laser tight and a substrate for the liquid crystal display panel according to the present invention will be described in detail with reference to accompanying drawings.

Embodiment 1

Figure 7:
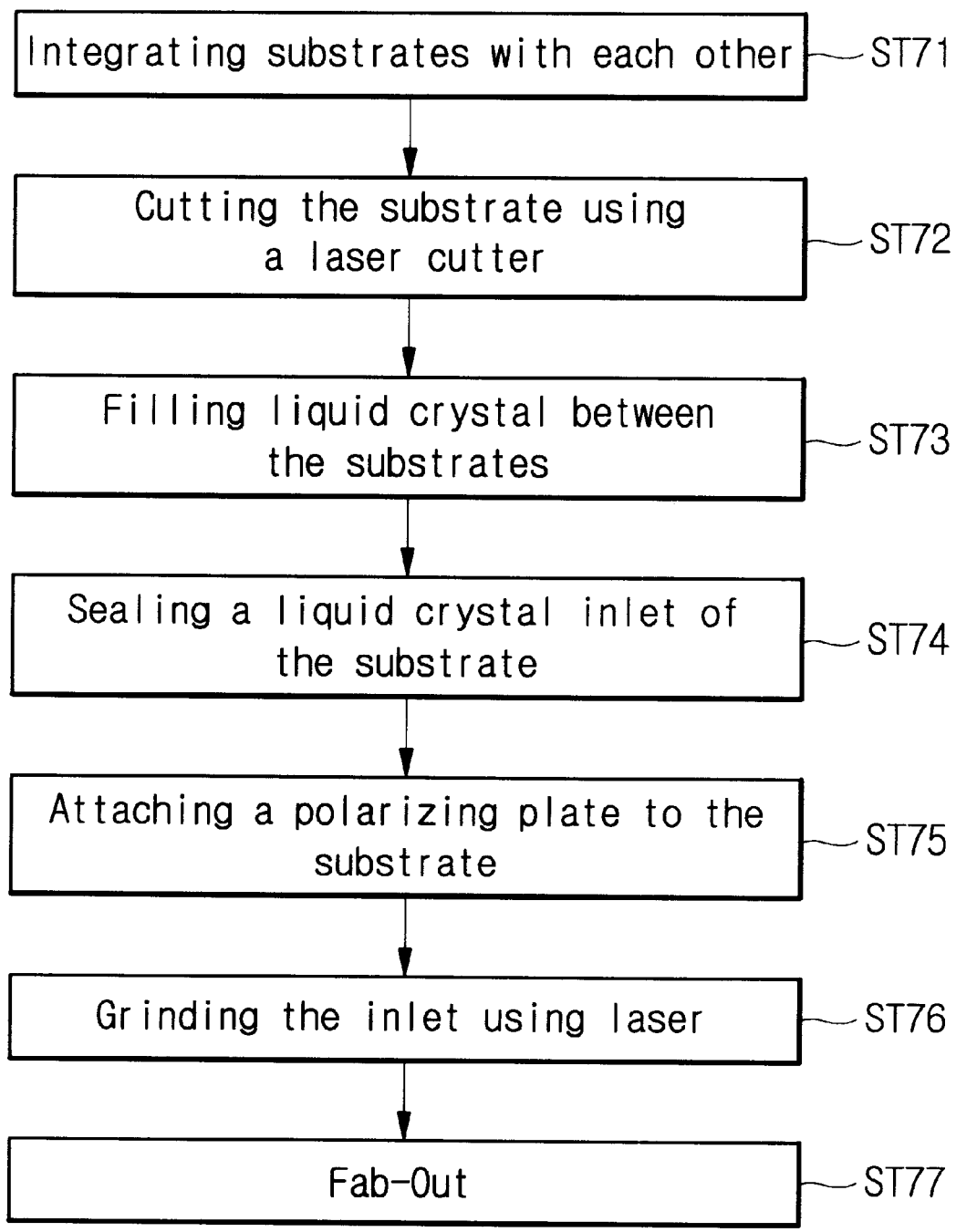
FIGS. 7 and 8 are flow charts showing a process of manufacturing the liquid crystal display panel according to the embodiment of the present invention.
Figure 8:
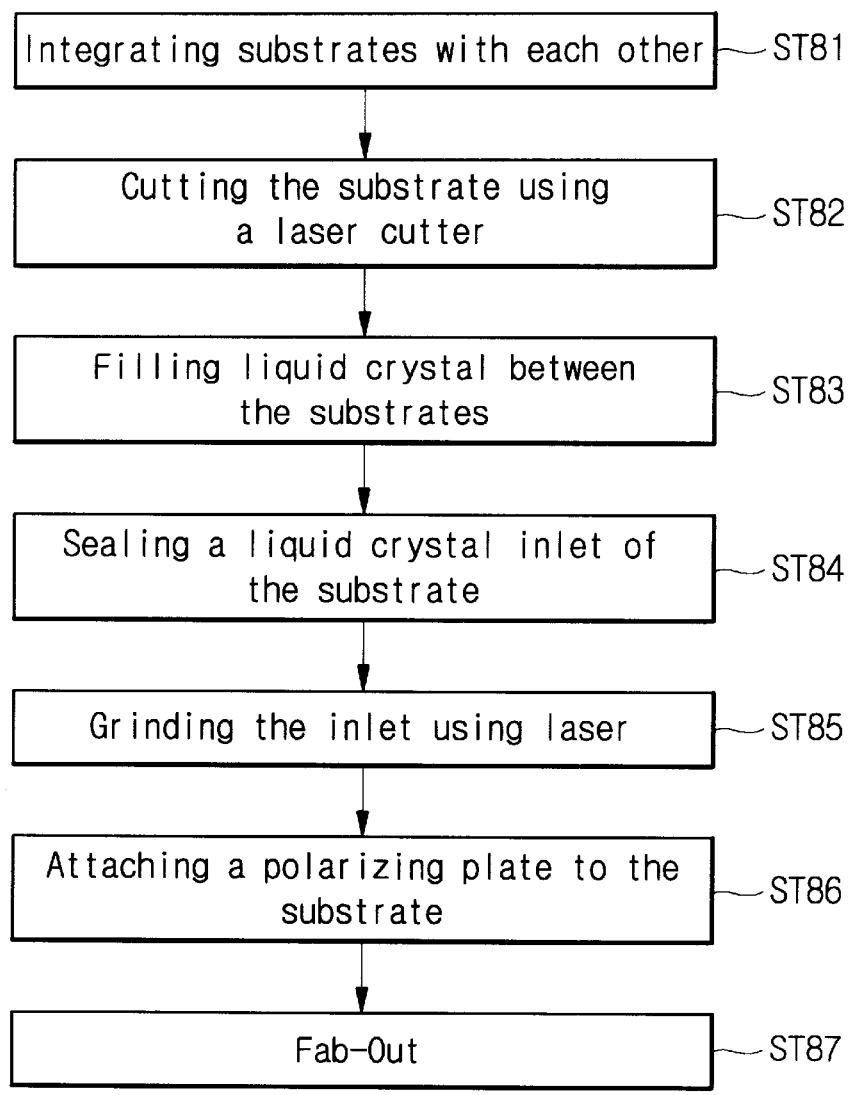

FIGS. 7 and 8 are flow charts showing a process of manufacturing a liquid crystal display panel according to the embodiment of the present invention.

Referring to FIG. 7, an integrated substrate is provided at a step ST71. The integrated substrate is comprised of a parent glass substrate for a thin film transistor substrate (hereinafter, referred to as TFT substrate) having an area corresponding to an area of at least one panel and a parent glass substrate for a color filer.

The parent glass substrate for the TFT substrate includes a plurality of gate lines, a plurality of data lines formed to intersect with the gate lines, thin film transistors and pixel electrodes formed at a point that the data lines intersects with the gate lines.

Figure 1:
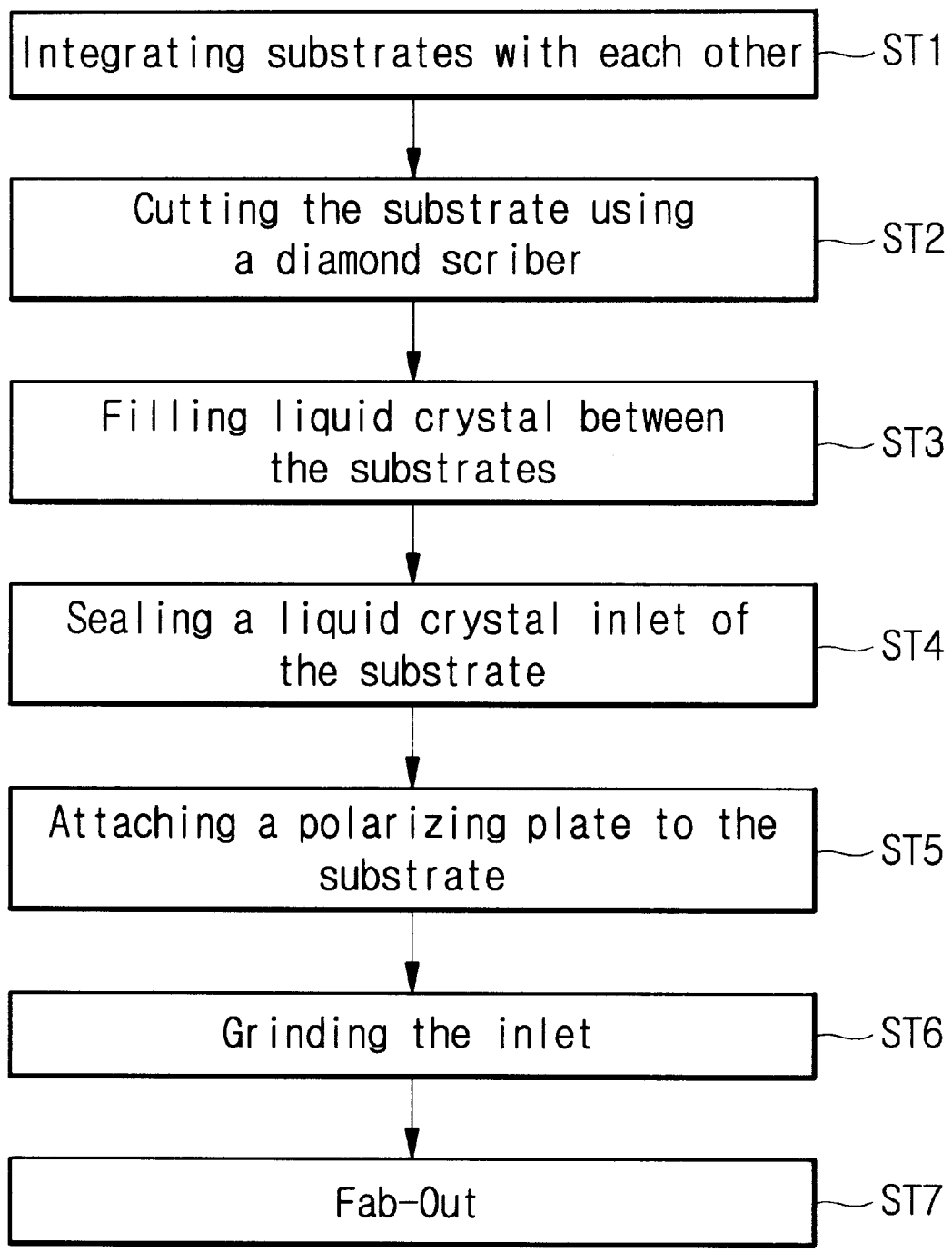
FIGS. 1 and 2 respectively are flow charts showing a process of manufacturing a liquid crystal display panel according to the conventional art.
Figure 2:
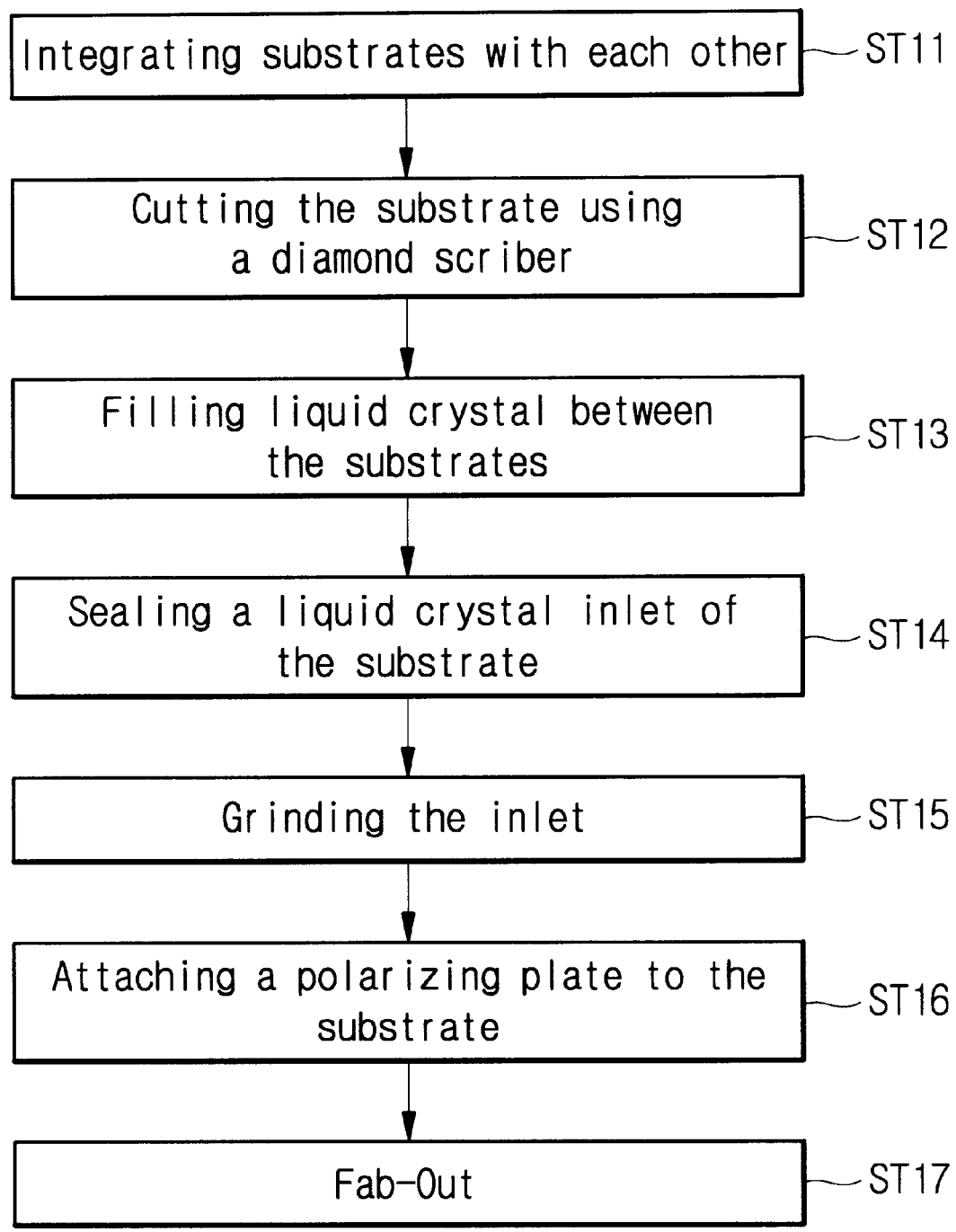
Figure 3:
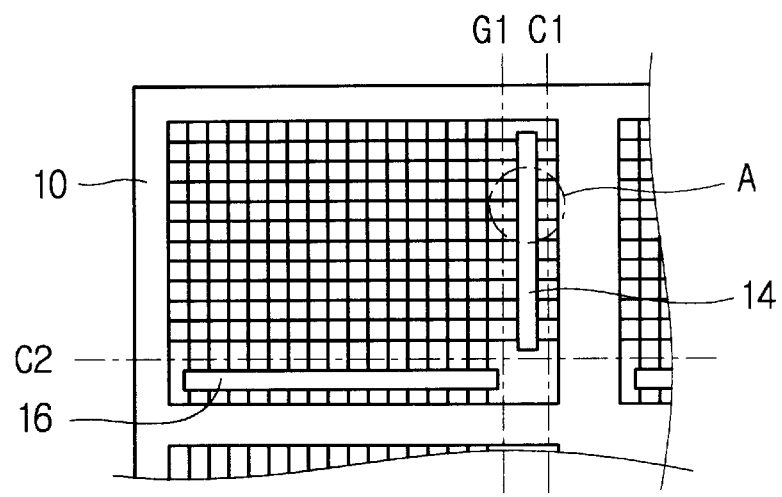
FIG. 3 is a schematic plan view of a thin film transistor substrate of the liquid crystal display panel according to the conventional art.
Figure 4:
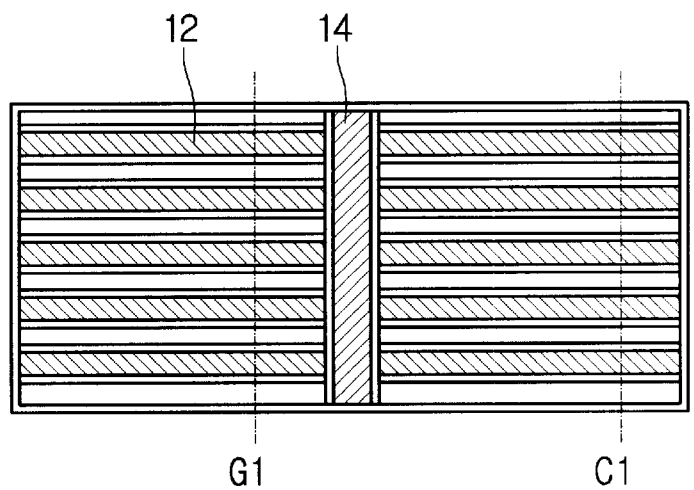
FIG. 4 is a detailed view of the thin film transistor substrate, marked in a circle A in FIG. 3.

The parent glass substrate also has short bars 14 disposed at each end of interconnection lines to be normal to the interconnection lines, connecting the interconnection lines with each other to prevent static charges from damaging TFTs on the panel while cutting, as shown in FIGS. 3 and 4. Cutting lines C1 and C2 locates parallel to and apart from the short bar 14 at a predetermined distance.

The parent glass substrate for the color filter substrate has formed thereon color filter layers respectively provided with red, green, and blue, a black matrix, and corresponding electrodes. The black matrix prevents lights of the color filter layers from being mixed and also prevents the TFTs from operating in an off line state.

The integrated substrate is cut along the cutting line by laser, at step ST72. The integrated substrates are cut by laser light one substrate and then the other substrate. The selected substrate is cut from the outer surface to the inner surface.

The substrate has a smooth cut surface, unlike a surface of the substrate cut by a diamond blade. Further, glass chips are not generated while grinding the substrate. Accordingly, it is possible to minimize errors due to the glass chips when attaching the polarizing plate to the outer surface of the substrate. The interconnection lines are cut sometimes because the glass chips press the interconnection lines during a process of TCP bonding. However, few glass chips generated while cutting the substrate prevent the interconnection lines from being cut during the process of TCP bonding. A corner of the outer surface where the cutting operation starts is a portion where a stress is concentrated. Therefore, the corner of the outer surface on the substrate is vulnerable to crack even by a small impact. Cutting substrates by laser does not concentrate the stress on the corner of the substrate, which improves a resistance to impact.

After cutting the substrate completely, the liquid crystal is filled between the TFT substrate and the color filter substrate, at step ST73. Then, a liquid crystal introducing inlet is sealed at step ST74.

Next, polarizing plates are respectively attached to each outer surface of the TFT substrate and the color filter substrate, at step ST75.

After attaching the polarizing plates, the edges of the substrate is ground by laser, at step ST76. The grinding by laser prevents static charges from generated due to a friction on the substrate, which protects the thin film transistors formed on the inner surface of the TFT substrate from damages by the static charges.

After grinding, the liquid crystal display panel (hereinafter, referred to as LCD panel) is carried to an assembly line in order to be assembled with other element.

In the process of attaching the polarizing plate to the outer surface of the substrates according to the embodiment of the present invention, the polarizing plates are attached to each outer surface of the integrated substrates in a light transmitting type LCD panel, but the polarizing plate is attached to only one outer surface of the integrated substrate in a light reflecting type LCD panel.

On the other hand, in the above-described embodiment, after attaching the polarizing plate, the substrate is ground. However, the substrate can be ground before attaching the polarizing plate.

As shown in FIG. 8, it is possible to perform the process of cutting the substrate along the cutting lines by using the laser light at step ST82, the process of filling the integrated substrates with the liquid crystal at step ST83, the process of sealing the liquid crystal introducing inlet at step ST84, the process of grinding the corner of the substrate at step ST85, and the process of attaching the polarizing plates to the substrates in sequence.

Figure 9:
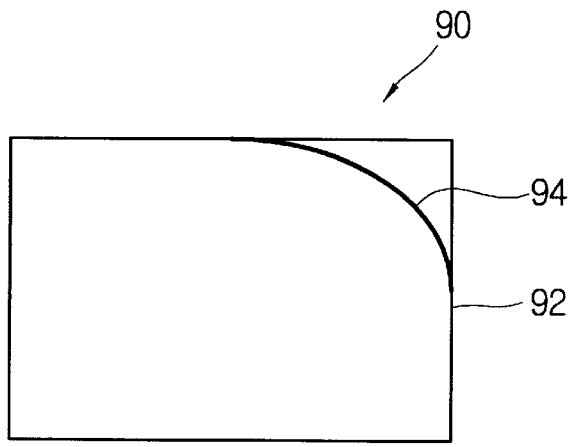
FIG. 9 is a partially sectional view of a corner of the substrate for the liquid crystal display panel according to the present invention, in which the corner of the substrate is grinded.

FIG. 9 is a sectional view of the cut surface 92 and the ground surface 94 of the substrate 90 which is cut according to the present invention. The surface 94 is ground to be round.

In the first embodiment of the present invention, both the cutting process and the grinding process are performed by laser. While the process of cutting the substrate is performed by using the laser light, however, by aligning laser focused on the outer surface of the substrate, of which an apsis is parallel and a minor axis is normal to the cutting line, the process of grinding the corner on the cut surface of the substrate can be omitted. Since the laser light with an ellipse shape round the edges of the cut surface, the grinding process is not required. In addition, the use of the laser light having the ellipse shape prevents the generation of glass chips on the inner surface of the substrate. Therefore, while connecting the end of a tape carrier package to the interconnection lines of the inner surface of the TFT substrate, the interconnection lines do not suffer from opening defect due to the glass chips.

According to the first embodiment, by eliminating glass chips that may generate during the cutting process, the defects in polarizing plate attachments and the short-cut problems of the interconnection lines while bonding the tape carrier package can be reduced. Further, since the laser grinding of the surface does not generate static charges, the thin film transistor can be safe from the damage by static charges.

Embodiment 2

The use of laser proposed in the first embodiment is effective for cutting the substrate. However, the use of laser according to the first embodiment is less effective for cutting the interconnection lines formed in the inner surface of the substrate. Therefore, it is required to provide a panel of which interconnection lines can be cut smoothly while cutting integrated substrates or single substrates.

Figure 10:
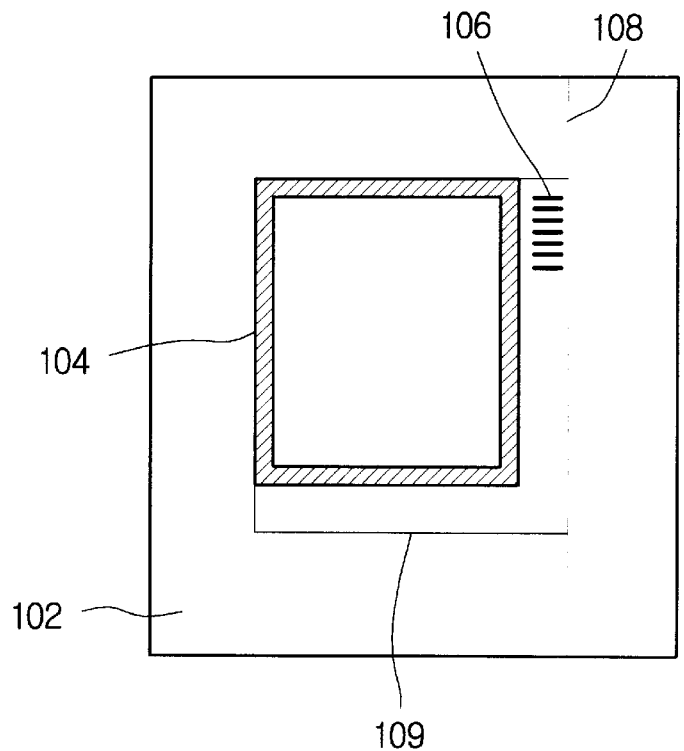
FIG. 10 is a schematic plan view of a liquid crystal display panel according to another embodiment of the present invention.

FIG. 10 is a schematic plan view showing a relation of the interconnection lines 106 and the cutting lines 108 on the integrated substrate for the LCD panel according to the second embodiment of the present invention. In FIG. 10, a reference numeral 104 denotes a black matrix having a square shape. The black matrix 104 is formed on one of the integrated substrates, for example on the color filter substrate, on which sealant is disposed to attach the substrates 102 together.

In FIG. 10, the interconnection lines 106, for example the data lines, adjacent to the cutting line 108 have ends spaced apart at a predetermined distance, for example about 1 mm, from the cutting line 108. The interconnection lines, for example the gate lines, adjacent to the cutting line 109 also have ends spaced apart at a predetermined distance from the cutting lines 109.

Figure 5A:
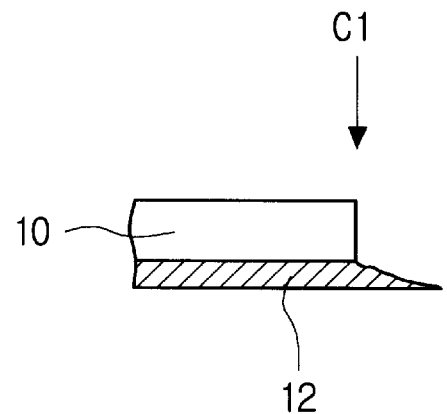
Figure 5B:
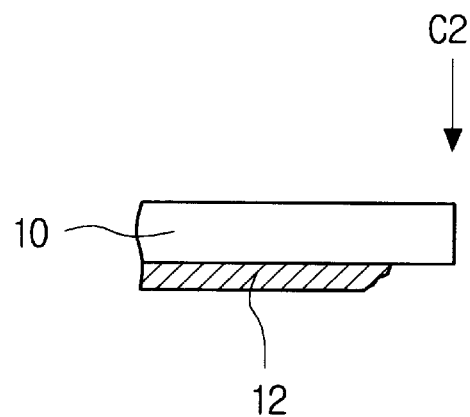
Figure 6:
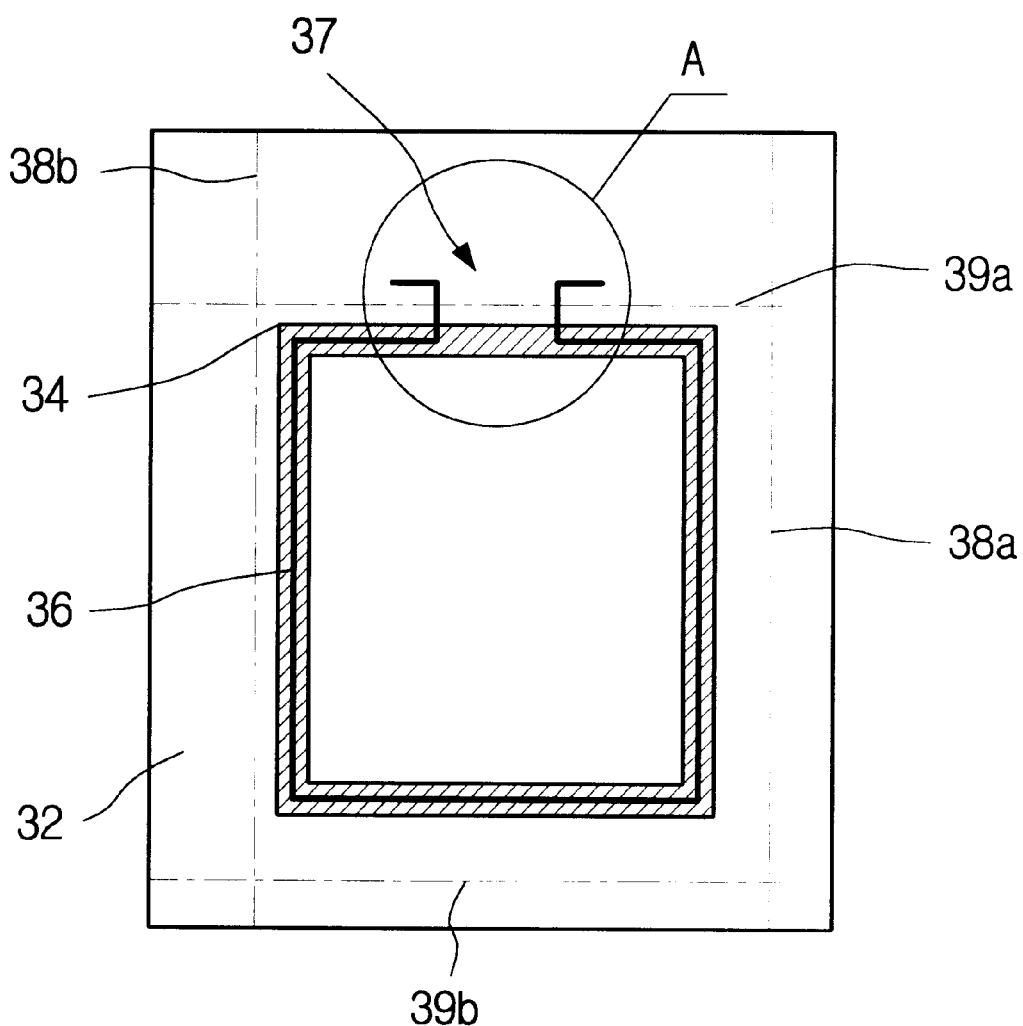
FIG. 6 is a plan view of a liquid crystal display panel according to an embodiment of the present invention.

Accordingly, even if the integrated substrates 102 are cut by using the laser light or the diamond cutter along the cutting lines 108 and 109 thereon, cutting defects as shown in FIGS. 5A and 5B may not occur in the substrates 102 because the interconnection lines are not extended below the cutting lines.

In the second embodiment, on the other hand, when the thin film transistors are used to switch pixel electrodes, an insulating film or a passivation film is covered on one of the inner surfaces of the integrated substrates. If the insulating film and the passivation film extend across the cutting lines 108 and 109, the insulating and passivation films can not be cut smoothly due to the property differences. Therefore, the insulating and passivation films must be formed within a region defined by the cutting lines 108 and 109 without extending below the cutting lines, in order to prevent the rough cut of those films.

The short bars 14 and 16 as shown in FIGS. 3 and 4 may be replaced with electrostatic diodes or protectors preventing the damage of static charges, which are formed within the region defined by the cutting lines 108 and 109.

When testing the TFT panel, not a bundle of the interconnection lines but an individual interconnection line is tested by a probe.

Figure 11:
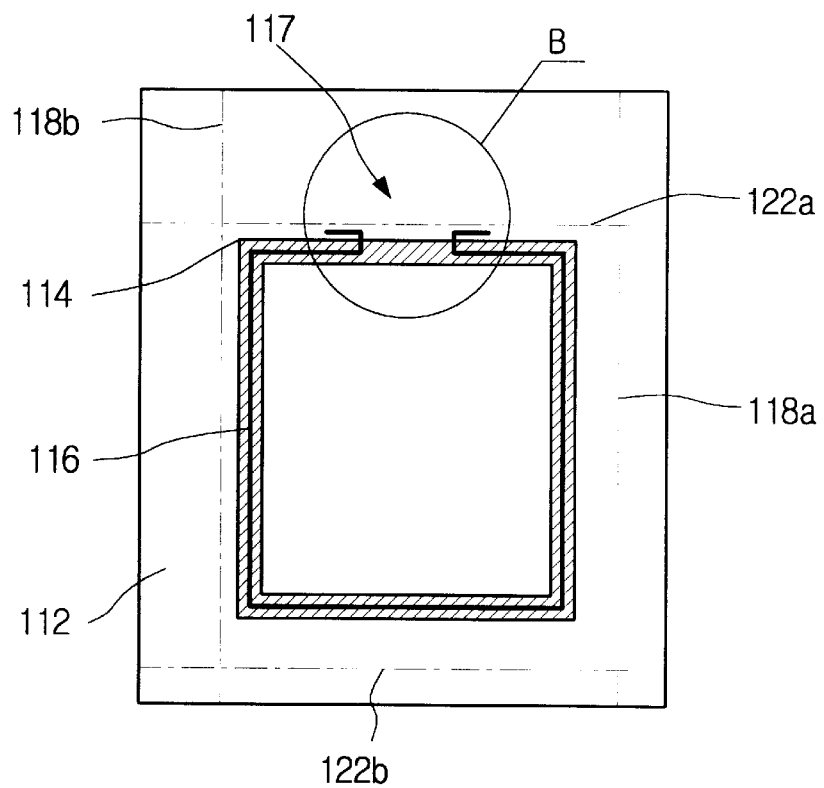
FIG. 11 is a schematic plan view of a liquid crystal display panel according to still another embodiment of the present invention.

FIG. 11 is a view showing the relation of the cutting line 122a and the liquid crystal introducing inlet 117 of the integrated substrate according to the another embodiment of the present invention. A reference numeral 114 denotes the black matrix formed on the inner surface of one of the integrated substrate. Reference numerals 118a, 118b, 122a, and 122b denote the cutting lines.

As shown in FIG. 11, a sealing line for the liquid crystal introducing inlet 117 is positioned within the region defined by the cutting line 122a.

The relation of the liquid crystal inlet 116 and the cutting line 122a parallel to the liquid crystal inlet 117 will be described with reference to FIG. 13 below.

Figure 13:
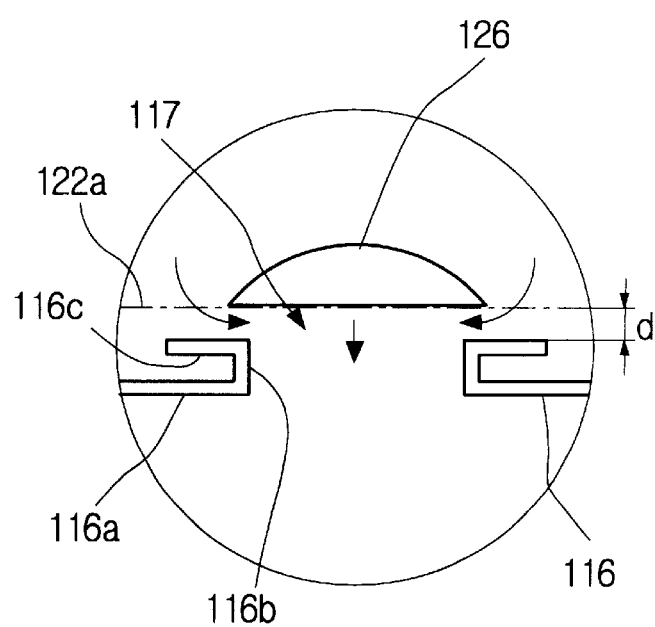
FIG. 13 is an enlarged view of a portion marked in a circle B in FIG. 11.

As shown FIG. 13, the sealing line 116 near the liquid crystal introducing inlet 117 is formed in a square shape, which includes a first line 116a having an opening, a second line 116b extending vertically from an end of the first line 116a and having a first length, and a third line 116c extending from an end of the second line 116b to be parallel to the cutting line 122a and having a second length.

A distance between the third line 116c and the cutting line 122a preferably is about 1 mm.

Figure 12:
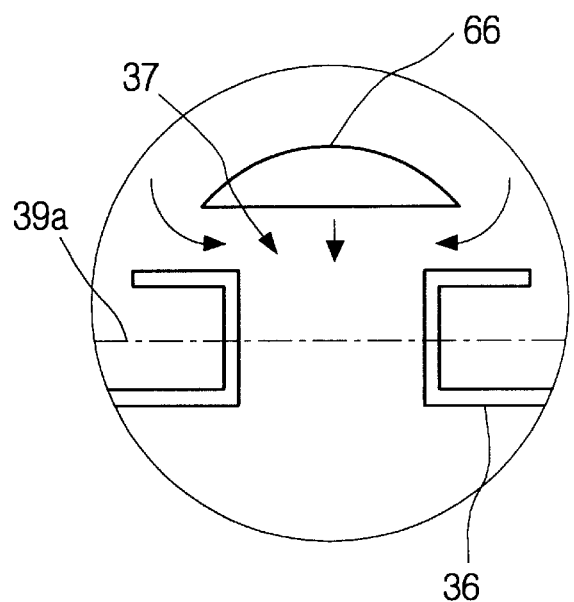
FIG. 12 is an enlarged view of a portion marked in a circle A in FIG. 6.

Referring to FIG. 12 and 13, the sealing line 116 according to the embodiment of the present invention has the second line 116b. That is, a neck of the liquid crystal inlet is shorter than that of the structure according to the conventional art. Accordingly, the third line 116c extending parallel to the cutting line 122a remains after the cutting of the integrated substrate.

The third line 116c makes air to be introduced into the integrated substrates through a path between the sealing agent 126 and the third line 116c when the sealing agent 126 is sucked in the liquid crystal introducing inlet 117 to seal the liquid crystal introducing inlet 117 at the sealing process. Therefore, the path through which the air is introduced into the integrated substrates is longer than that of the conventional art, which substantially prevents the introduction of air.

The integrated substrates as constructed above are cut by emitting the laser light along the cutting line and spreading a refrigerant on the substrates to generate cracks.

Alternatively, the cutting lines are formed at a predetermined depth on the substrate using a diamond blade. Then, a small impact on the substrates along the cutting line may divide the substrates into a plurality of small-sized panels.

The substrate made of quartz can be used for the embodiment of the present invention. In this case, the panel according to the present invention can provide the same effect as the panel made of the glass substrate.

On the other hand, in the second embodiment of the present invention, the LCD panel is described as that the interconnection lines are positioned within the region defined by the cutting lines and that the sealing agent is disposed within the region defined by the cutting lines. However, both the interconnection lines and the liquid crystal introducing inlet may be located within the region defined by the cutting lines.

In the second embodiment as described above, since the interconnection lines, the corresponding electrodes, and the liquid crystal introducing inlet are positioned within the region of the substrate defined by the cutting lines, the interconnection lines are protected from rough cut during the cutting of the substrate.

Further, at the sealing process to enclose the liquid crystal introducing inlet, the introduction of the air into the liquid crystal layer is minimized to protect the liquid crystal layer.

Moreover, by introducing the laser cutting, the substrates can be cut under the same cutting condition, which simplifies the processes.

Embodiment 3

The LCD panel proposed in the second embodiment has the interconnection lines and the liquid crystal introducing inlet positioned within the region defined by the cutting lines, which requires the LCD panel design change. However, the LCD panel according to the third embodiment of the present invention can prevent an abnormal cutting of the interconnection lines without changing of the length of the interconnection lines.

Figure 14:
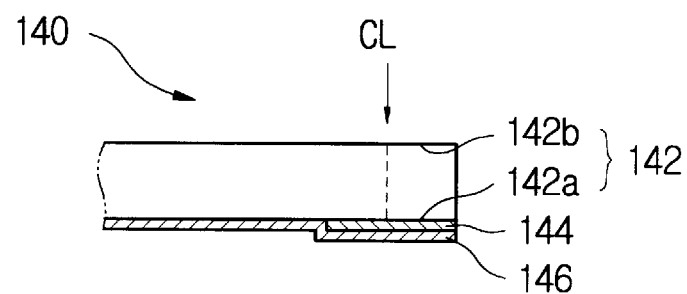
FIG. 14 is a partial sectional view of a substrate to be cut according to still another embodiment of the present invention.

FIG. 14 is a partially sectional view of the substrate to be cut according to the third embodiment of the present invention.

Referring to FIG. 14, the glass substrate 32 is used as the substrate 142 to be cut, in which the conductive interconnection lines, for example the interconnection lines made from aluminum having a high toughness is arranged on the inner surface of the substrate 142 so that ends of the interconnection lines extend across the cutting lines. A reference character CL denotes the cutting line of the glass substrate. The substrate 142 is cut from the outer surface 142b to the conductive interconnection lines 146 through the inner surface 142a thereof.

A buffer layer 144 having a low toughness is disposed between the substrate 142 and the conductive interconnection lines 146. The buffer layer 144 has a predetermined width along the cutting line CL. When the buffer layer 144 is cracked, the interconnection line 146 is also cracked together with the buffer layer 144.

Figure 15:
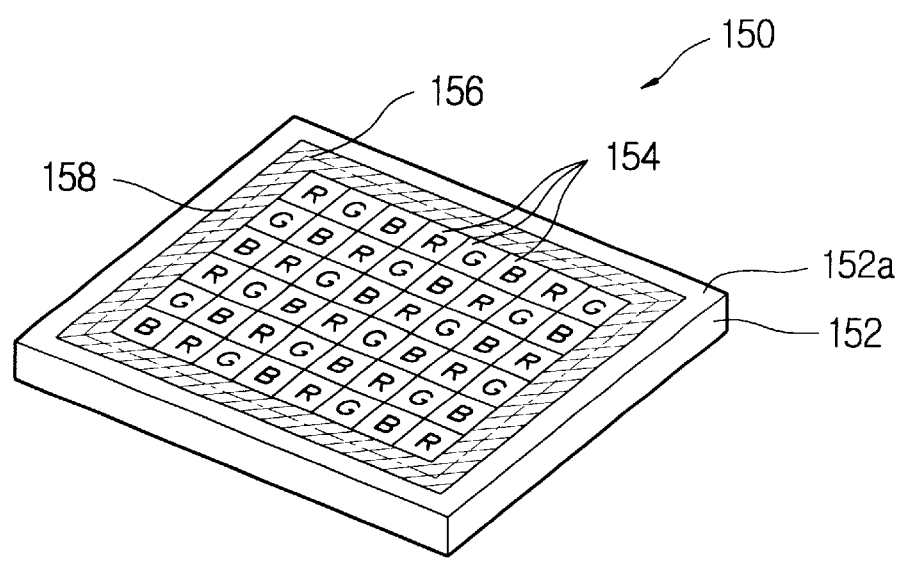
FIG. 15 is a perspective view of a color filter substrate to be cut according to still another embodiment of the present invention.
Figure 16:
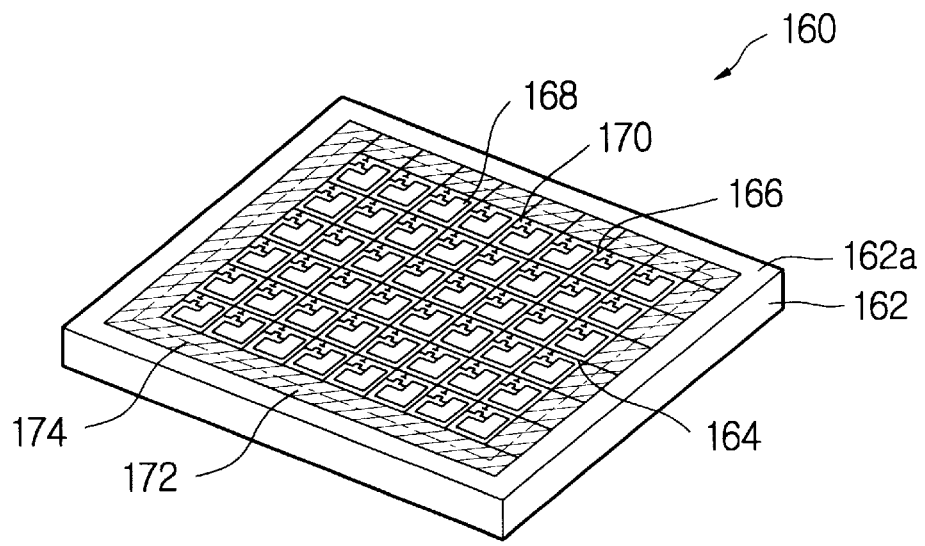
FIG. 16 is a perspective view of a thin film transistor substrate to be cut according to still another embodiment of the present invention.

FIG. 15 is a perspective view of a color filter substrate to be cut according to still another embodiment of the present invention. FIG. 16 is a perspective view of a thin film transistor substrate to be cut according to still another embodiment of the present invention.

Referring to FIG. 15, the color filter substrate 150 made from the glass substrate is provided as an object to be cut in which the color filter layer 154 having the red, green, and blue colors is formed on the inner surface 152a of the glass substrate 152. The corresponding electrodes (not shown) are disposed on the color filter layer 154 of the color filter substrate 150.

Since the corresponding electrodes lies along the cutting line 156, the corresponding electrodes may not be cut precisely. Therefore, a buffer layer 158 of a predetermined width is disposed along the cutting line between the inner surface 152a of the substrate 152 and the corresponding electrodes.

The buffer layer 158 is made of metal having the low toughness as described above. Preferably, the buffer layer 158 is made of the same material as the black matrix layer (not shown) in the same process. In the third embodiment of the present invention, the black matrix layer and the buffer layer 158 are made of chromium (Cr).

Referring to FIG. 16, the TFT substrate 160 containing the gate lines 164, source lines 166, pixel electrodes 168, and thin film transistors 170 formed on the inner surface 162a of the glass substrate 162 is to be cut.

When the gate lines 164 and the source line 166 of the TFT 160 extend to the cutting line 174, as described above, the abnormal cutting of the substrate may be performed. Therefore, the buffer layer 172 having the low toughness is disposed along the cutting line between extensions of the interconnection lines and the inner surface, 162a of the glass substrate 162.

Figure 17:
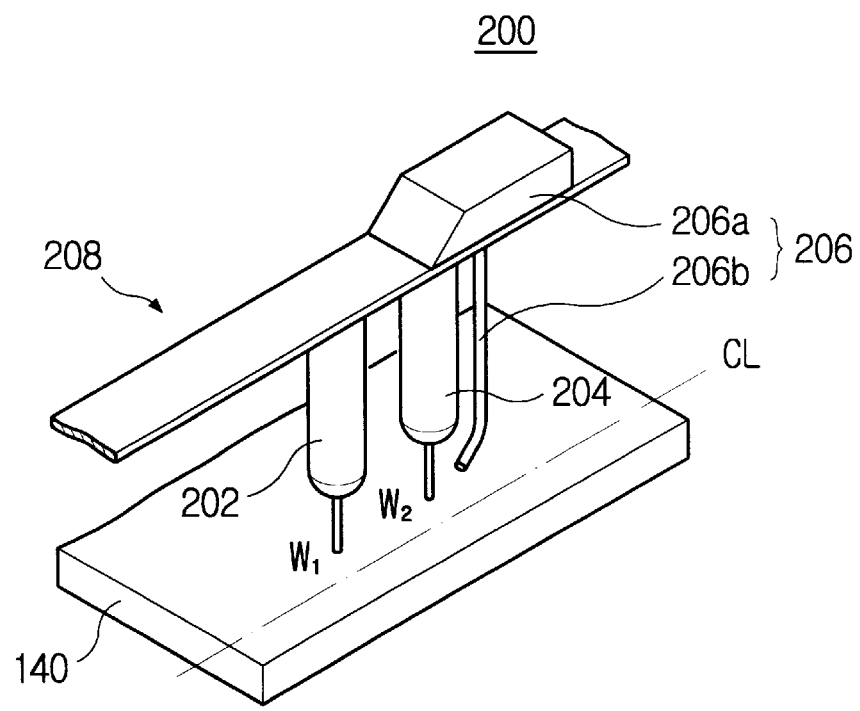
FIG. 17 is a schematic perspective view of a laser cutter for cutting substrates in FIGS. 14 to 16.

The embodiment shown in FIGS. 14 to 16 can be cut using a laser cutter shown in FIG. 17, without defects in cutting the interconnection lines.

Referring to FIG. 17, the cutter is a device capable of cutting the substrate using the laser lights respectively having wavelengths w1 and w2. The laser light having the wavelength w1 (hereinafter, referred to as a first laser light) is used for generating the crack on the glass substrates 142, 152, and 162, and the laser light having the wavelength w2 (hereinafter, referred to as a second laser light) is used for generating the crack on the buffer layers 144, 158, and 172.

A laser whose wavelength is 10.6 $\mu$m with an output of 50~250 w, such as a yag laser, $CO_2$ laser, gallium-arsenide laser and ruby laser can be used for those purposes.

The process of cutting the color filter substrate 150 and the TFT substrate 160 integrated together using the cutter of FIG. 17 will be described.

The integrated substrate is laid on a plate of the cutter 200. The outer surface of the color filter substrate 150 is facing the cutter 200.

A first laser light emitter 202 of the cutter 200 emits the first laser light having the wavelength w1 focusing the cutting line 156 of the color filter substrate 150 and concentrating on the glass substrate 152. A second laser light emitter 204 adjacent to the first laser light emitter 202 emits the second laser light having the wavelength w2, which in turn is transmitted through the glass substrate 152 and focused on the buffer layer 158.

The glass substrate 152 and the buffer layer 158 are heated by the first and second laser light, which expand along the cutting line 156 in part and have the stress concentrated on the cutting line thereon.

A refrigerant spreading unit 206 following the second laser emitter 204 sprays a refrigerant at an interval of 0.1~0.3 second on the cutting line on which the stress is concentrated. Therefore, the glass substrate 152 and the buffer 158 which are heated by the laser lights are rapidly cooled.

The cutting lines of the glass substrate 152 and the buffer 158 are expanded and contracted by heat and refrigerant, so that the high stress is generated along the cutting lines.

When the stress is a larger than a combination force of glass molecules, the amorphous glass molecule structure is broken and the surface of the glass substrate 152 starts to crack.

At this time, a direction of the crack's creation and progression is the same as that of the laser radiation. That is, the crack is progressed from the outer surface to the inner surface of the glass substrate 152, resulting in that the glass substrate 152 is cut thoroughly.

On the other hand, the buffer layer 158 has a stress thereon due to the expansion and contraction by the second laser light and the refrigerant applied on the buffer layer 158.

When the stress is larger than a combination force of chromium atoms, a crystal, structure of the buffer layer 158 is broken, resulting that a crack is created on the surface of the buffer layer 158.

At this time, the crack is spread into the interconnection lines, which cut the corresponding electrodes on the edges of the interconnection lines smoothly along the cutting line of the glass substrate 152.

As described above, after cutting the color filter substrate 150 completely, the integrated substrate is flipped over such that the outer surface of the TFT substrate is facing the laser cutter 200 and cut in such a manner as described above.

The color filter substrate 150 and the TFT substrate 160 used in the present embodiment are made of the same glass substrate and the same buffer layer. The first and second laser emitters for cutting the color filter substrate 150 can be used for cutting the TFT substrate without changing laser emitters.

On the other hand, the materials for the buffer layers of the color filter substrate and the TFT substrate may be different, depending on the material for the corresponding electrodes of the color filter substrate and the material for the interconnection lines of the TFT substrate. In such a case, when the color filter substrate is cut first and then the TFT substrate is cut, the buffer layer of the TFT substrate may not be smoothly cut. To solve this problem, the cutter shown in FIG. 17 may include another laser emitter capable of emitting a laser light having a third wavelength different from the first and second laser lights.

Regarding the above embodiment, while the substrate having a size corresponding to the panel size has been described, the laser cutter according to the present invention is suitable to cut the parent glass substrate having an area corresponding to a total area of at least two panels in order to improve the productivity.

In the above-described embodiment, although the laser cutter has been described to emit the first laser light so as to create the crack on the glass substrate and then to emit the second laser light so as to create the crack on the buffer layer, the laser cutter may emit the second laser light first and then the first laser light to cut the substrate.

According to the third embodiment of the present invention, when the LCD panel or the integrated glass substrate having the conductive interconnection lines thereon is cut by the laser cutter, by laying a buffer layer of low toughness and having a property of transferring the crack rapidly between the conductive interconnection lines and the glass substrate, the conductive interconnection lines can be smoothly cut.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A substrate capable of being cut by a laser light, comprising:

a substrate having an outer surface with a cutting line and an inner surface; a conducting layer deposited on the inner surface along a cutting line of the inner surface corresponding to the cutting line on the outer surface of the substrate; and a buffer layer disposed along the cutting line between the inner surface and the conducting layer of the substrate, wherein the substrate and the buffer layer are separately cut by laser lights having different wavelengths and the conducting layer is cracked by the buffer layer.

2. A liquid crystal display panel capable of being cut by a laser light, comprising:

a first transparent insulating substrate including thin film transistors formed on an inner surface and a conducting layer connected to the thin film transistors and pixel electrodes;

a second transparent insulating substrate having an inner surface corresponding to the first transparent insulating substrate, a color filter layer formed in the inner surface, a black matrix and corresponding electrodes; and a buffer layer disposed between the conducting layer and the inner surfaces and diffusing a crack generated therein to the conducting layer vertically, wherein one of the first and second substrate has a cutting line on the outer surface thereof and the first and second substrates and the buffer layer are respectively cut by laser lights having a different wavelength.

3. A liquid crystal display panel capable of being cut by a laser light as claimed in claim 2, wherein the first transparent insulating substrate and the second transparent insulating substrate are made of a parent glass substrate of an area larger than a sum of areas of at least two panels.

4. A liquid crystal display panel capable of being cut by a laser light as claimed in claim 1, wherein the buffer layer is formed with a predetermined width on the inner surface of one of the first and second substrates along a line corresponding to the cutting line formed on the outer surface of one of the first and second substrates.

5. A liquid crystal display panel capable of being cut by a laser light as claimed in claim 2, wherein the buffer layer is formed with a predetermined width on the inner surfaces of the first and second transparent insulating substrates along lines corresponding to the cutting line on the outer surface.

* * * * *